United States Patent [19]

Shaffer

[11] 4,087,482

[45] May 2, 1978

[54] FURFURYL ALCOHOL MODIFIED POLYESTER RESINS CONTAINING METAL ATOMS

[75] Inventor: Robert C. Shaffer, Playa del Ray, Calif.

[73] Assignee: Hitco, Irvine, Calif.

[21] Appl. No.: 714,403

[22] Filed: Aug. 16, 1976

[51] Int. Cl.² ............................................. C08L 67/06
[52] U.S. Cl. ................................. 260/868; 260/75 N; 260/75 VA; 260/870; 526/241; 526/270
[58] Field of Search ...................... 526/270, 204, 241; 260/750 A, 828, 868, 870

[56] References Cited

U.S. PATENT DOCUMENTS

| | | | |
|---|---|---|---|
| 3,370,026 | 2/1968 | Patella et al. | 260/75 VA X |
| 3,519,698 | 7/1970 | Baum | 260/75 VA X |
| 3,544,530 | 12/1970 | Shaffer | 526/270 |

*Primary Examiner*—Walter C. Danison
*Attorney, Agent, or Firm*—Roylance, Abrams, Berdo & Kaul

[57] ABSTRACT

There are disclosed furfuryl alcohol copolymers of a polyester prepolymer of maleic acid or anhydride and a polyhydric alcohol which incorporate tungsten and/or molybdenum metal atoms. The metal atoms are incorporated into the copolymers by reacting the polyester prepolymer with a reaction product of tungsten or molybdenum and pyrrolidine.

4 Claims, No Drawings

FURFURYL ALCOHOL MODIFIED POLYESTER RESINS CONTAINING METAL ATOMS

This invention relates to thermosetting furfuryl alcohol modified polyester resins which incorporate metal atoms.

In preparing high temperature, corrosion and ablative resistant structures, it is the practice to impregnate refractory materials with a synthetic resin, shape the structure to the desired form, and thereafter finally cure the resin at the necessary elevated temperatures. Useful resins used heretofore for this purpose have included, for example, phenolic resins, epoxy resins and the like. With the advent of aerospace products, the requirements for materials having suitable ablative characteristics have become even more critical and, accordingly, the presence of carbonized products has found particularly acceptable application in this field. Thus, in preparing such products, resin impregnated refractory materials such as silica, carbon and graphite fibers and fabrics have been heated at high temperatures in order to reduce the impregnated resins substantially to carbon. The resulting products have improved high temperature characteristics due to the carbonized matrix materials present therein. The properties of the resins used to impregnate and coat the refractory fiber materials must be such that during the pyrolysis outgasing problems are minimized with a substantial amount of the original resin material being retained in the form of carbon matrix in the product structure. Thus, resin products, which upon carbonization undergo extensive volatilization, will not only yield a product in which a substantial amount of the pyrolyzing resin matrix has been driven off, but there is the additional danger that outgasing may occur at such a rate and in such a manner that the integrity of the refractory fibers or cloth composite may be impaired. In addition, where a substantial portion of the resin has been decomposed during the carbonization, a weakened structure may also result.

U.S. Pat. No. 3,544,530 discloses synthetic resins prepared by polymerizing furfuryl alcohol with an ester prepolymer of maleic acid or anhydride and a polyhydric alcohol. These copolymers, when pyrolyzed at high temperatures, retain a substantial amount of the original resin weight. Accordingly, these copolymers are valuable in preparing carbonized, high temperature, corrosion resistant and ablative products. The disclosure of this patent is incorporated herein by reference.

It has now been discovered that the properties of the resins disclosed in U.S. Pat. No. 3,544,530 may be even further improved by incorporating therein at least one metal selected from the group consisting of tungsten and molybdenum. Thus, in accordance with the present invention, tungsten and/or molybdenum metal atoms are incorporated into a furfuryl alcohol copolymer of a polyester prepolymer of maleic acid or anhydride and a polyhydric alcohol.

In order to prepare the metal containing polymers of this invention, a complex is first prepared by reacting tungsten carbonyl or molybdenum carbonyl, with pyrrolidine. The reaction between the metal carbonyl and pyrrolidine may be accomplished in one of several methods found in the literature, e.g., an article by Fowles et al entitled "The Reactions of Group VI Metal Carbonyls with Pyrrolidine, Piperazine, and Morpholine", *Inorganic Chemistry*, Vol. 3, No. 2, February 1964, pages 257–259. The reaction product consisting of the pyrrolidine-metal carbonyl complex is ground to a fine powder for subsequent reaction with the polyester prepolymer.

The polyester prepolymer is prepared by reacting maleic acid or anhydride with a polyhydroxy compound. Polyhydroxy compounds which may be utilized in preparing the prepolymers are polyols having the general formula:

wherein $n$ is an integer between 2 and 4 and wherein R is a hydrocarbon group containing between 2 and about 20 carbon atoms. Other suitable materials include polyoxyalkylene glycols or polyalkylene glycols ethers of the general formula:

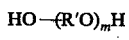

wherein R' is an alkyl group of between about 2 and about 4 carbon atoms and wherein $m$ is an integer of at least 2. Specific polyols which may be utilized include ethylene glycol, diethylene glycol, triethylene glycol, trimethylene glycol, tetraethylene glycol, 1,5-pentane diol, tetramethylene glycol (1,4-butylene glycol), 1,8-octane diol, glycerol, pentaerythritol, xylene glycol, polyoxyethylene glycol and polyoxypropylene glycol. Preferred mononuclear aromatic polyols are the polyhydric phenols such as hydroquinone, resorcinol and the like.

The polyester prepolymers are preferably prepared by reacting at least a slight stoichiometric excess of maleic anhydride or maleic acid with a polyhydric alcohol. Such polyester prepolymers are of relatively short chain length as compared to those wherein an excess of alcohol is used. The excess acid results in prepolymers characterized by fewer ester linkages and containing sufficient terminal acid groups to readily catalyze furfuryl alcohol copolymerization and to permit reaction of the polyester prepolymer with the reaction product of pyrrolidine and metal carbonyl.

The polyester prepolymer is reacted with the pyrrolidine/metal carbonyl reaction product by combining the two materials and heating the reaction mixture, preferably within the range of from about 100°–200° C. The amount of pyrrolidine/metal carbonyl reaction product which is reacted with the polyester prepolymer may vary widely. Preferably from about 30 to 150 parts by weight of pyrrolidine/metal carbonyl reaction product is reacted with 100 parts by weight of polyester prepolymer.

The polyester prepolymer containing metal atoms is a thermoplastic polymer. This polymer is then reacted with furfuryl alcohol to form a thermosetting copolymer. The ratio of furfuryl alcohol to the metal containing polyester prepolymer can be within the range of 0.1 to 3.0 moles of furfuryl alcohol to 1 equivalent of maleic anhydride in the polyester form. The preferred range is 0.6 to 1.2 moles of furfuryl alcohol to one equivalent of maleic anhydride in the polyester. The furfuryl alcohol may be copolymerized with the metal containing polyester prepolymer by mixing the two materials under ambient conditions and thereafter heating in order to react the resulting resin to the desired state.

Suitable curing temperatures are between about 150° and 500° F. and preferably between about 180° and 400° F. The specific curing times and temperatures will depend upon the desired physical state of the resin and the particular use or treatment of the product. Where the resins are to be used for impregnating fiber or fabrics or in laminating, an intermediate or partial curing is usually preferred; this partial cure is sometimes referred to as "B"-stage. B-stage temperatures of about 200° F. are suitable for this purpose and thereafter the staged composition may be stored at ambient temperatures, without the cure reaction proceeding to a point where the polymer becomes hard and unusable.

The metallic component of these resins, having been polymerized with the polyester prepolymers, is an integral part of the molecular structure of the resin and is therefore of atomic or near atomic size. Such resins, when pyrolyzed, show no evidence of metal loss via vaporization nor are metal agglomerates present. This is in contrast to resin compositions in which organo metallics have been mixed into the resin systems prior to cure — such systems result in relatively large metallic particles due to agglomeration or in loss of metallic content during the high firing temperatures necessary to convert the resin to carbon and/or graphite. Resin systems of this latter type which are converted to carbon or graphite are also vulnerable, in that, the free metal particles melt when subjected to very high temperatures and/or under conditions of high energy absorption causing loss of composite integrity.

The resins of this invention which have been converted to carbon and/or graphite, although containing metal atoms as high as 45% by weight, show no evidence of melting at temperatures higher than the melt point of the basic metal or its carbides.

The metal containing copolymers of this invention are valuable in preparing carbonized, high-temperature, corrosion resistant and ablative products under conditions known to those skilled in the art. Specifically, high silica fabric materials prepared by leaching glass fibers, as set forth in U.S. Pat. Nos. 2,491,761; 2,624,658; and 3,262,761 or carbonaceous fibers prepared by pyrolyzing cellulosic materials such as cotton, rayon and the like under controlled conditions, as disclosed, for example, in U.S. Pat. No. 3,294,489 may be impregnated with the metal containing resins of the present invention and thereafter pyrolyzed at temperatures of between about 800° and 5,500° F. The resulting products retain a substantial and desirable amount of the original resin volume and weight, and yet are characterized by the improved ablative and temperature and corrosion resistant properties taken on as a result of the pyrolysis.

The impregnated fibrous material may be used to form molded articles, such as rocket engine nozzles and reentry materials, such as rocket nose cones. The presence of the metal atoms in the resin renders the material capable of absorbing large quantities of energy and also results in a higher density material which generally produces improved ablative properties.

The metal containing copolymers of this invention may also be used to form films or coatings or may be cast. They may be used in combination with conventional adjuvants such as film forming prepolymers, fillers, etc. with which they are compatible. The metal containing copolymers may also be cured and then carbonized and/or treated at graphitizing temperatures and the resultant material ground to provide particles which may be used as a filler in resins, elastomers, etc. to impart energy absorbing characteristics of the metal containing copolymers.

The following examples illustrate the practice of this invention:

EXAMPLE I

One mole equivalent of tungsten hexa carbonyl and an excess of pyrrolidine were reacted to form the metal pyrrolidine complex. At the completion of the reaction, the product was washed and ground to a fine powder.

A prepolymer was prepared by placing one mole equivalent of maleic anhydride in a reaction vessel, raising the temperature to 130° C. and adding 0.83 mole equivalent of ethylene glycol with thorough mixing while maintaining the temperature. The reaction was continued at 130° C. until a liquid prepolymer was obtained. This prepolymer was then cooled to ambient temperature. A portion of the prepolymer thus obtained was thoroughly mixed with the tungsten hexa carbonyl pyrrolidine reaction product in the ratio of 10 parts by weight of prepolymer to 15 parts by weight of the tungsten hexa carbonyl pyrrolidine reaction product. This mixture was then heated to a maximum temperature of 205° C. From this reaction, a highly viscous, dark polymer was obtained. This polymer was then blended with 8 parts by weight of furfuryl alcohol and the mixture was heated to between 100° and 200° C. The reaction was maintained at this temperature range until the desired viscosity had been achieved at which point heating was discontinued and the reaction product rapidly cooled. The resultant polymer was a highly viscous dark liquid which was soluble in certain organic solvents. The polymer obtained was then diluted and used to impregnate graphite fabric. Thereafter, the resin-fiber composition could be moulded under heat and pressure to form an insoluble and infusible mass.

EXAMPLE II

The procedure of the preceding example was repeated except that the prepolymer was prepared by reacting two mole equivalents of maleic anhydride with one mole equivalent of ethylene glycol.

EXAMPLE III

A prepolymer was prepared by mixing one mole equivalent of maleic anhydride heated to 130° C. with 0.5 mole equivalent of ethylene glycol and thoroughly mixing while maintaining the temperature at 130° C. until a viscous prepolymer liquid was obtained. The prepolymer thus obtained was mixed with the reaction product of tungsten hexa carbonyl and pyrrolidine obtained as described in Example I in the ratio of 30 parts by weight of prepolymer to 15 parts by weight of tungsten hexa carbonyl pyrrolidine reaction product. The process of Example I was then followed to obtain a highly viscous polymer material. This polymer material was blended with 15 parts by weight of furfuryl alcohol and the mixture was heated to between 100° and 200° C. The reaction was maintained in this temperature range until the desired viscosity was reached. At this point, heating was discontinued and the reaction product was rapidly cooled. The resultant polymer was a highly viscous dark liquid which was stable when stored at 25° C. and which thereafter could be cured at higher temperatures to form a black infusible solid matrix.

EXAMPLE IV

One mole equivalent of molybdenum hexa carbonyl and an excess of pyrrolidine was reacted to form the metal pyrrolidine complex. At the completion of the reaction the product was washed and ground to a powder.

A prepolymer was prepared by mixing one mole equivalent of maleic anhydride heated to a temperature of 130° C. with one mole equivalent of ethylene glycol and thoroughly mixing while maintaining the temperature at 130° C. The reaction was continued at 130° C. for approximately 4 hours until a viscous prepolymer was obtained. This prepolymer was then cooled to ambient temperature. A portion of the prepolymer thus obtained was thoroughly mixed with the molybdenum hexa carbonyl pyrrolidine reaction product in a ratio of 30 parts by weight of prepolymer to 15 parts by weight of the molybdenum hexa carbonyl pyrrolidine reaction product. This mixture was then heated to a maximum temperature of 205° C. From this reaction, a highly viscous dark polymer was obtained. The polymer was blended with 15 parts by weight of furfuryl alcohol per 39 parts of polymer and the mixture heated to between 100° and 200° C. The reaction was maintained at this temperature for approximately 4 hours until the desired viscosity had been achieved at which point heating was discontinued and the reaction product rapidly cooled. The resultant metal containing polymer was a highly viscous dark liquid, soluble in certain organic solvents. The polymer was stable when stored at 25° C. and could thereafter be cured at higher temperatures; e.g., 210° C., to form a black, infusible solid matrix.

What is claimed is:

1. A copolymer of furfuryl alcohol and a polyester prepolymer which is a condensation product of a slight stoichiometric excess of maleic acid or anhydride and a polyhydric alcohol, said copolymer containing tungsten and/or molybdenum metal atoms, said polyester prepolymer having been reacted with a complex which is a reaction product of tungsten carbonyl and/or molybdenum carbonyl with pyrrolidine.

2. A copolymer as defined in claim 1 wherein from about 30 to 150 parts by weight of said reaction product is reacted with 100 parts by weight of polyester.

3. A copolymer as defined in claim 1 wherein said metal is present in said copolymer in such a manner as to remain in the charred resin product without volitilizing and to show no evidence of metal particle agglomeration.

4. A method for producing a copolymer as defined in claim 1 which comprises first reacting a tungsten carbonyl and/or a molybdenum carbonyl with pyrrolidine, subsequently reacting the resultant product with a polyester prepolymer of maleic acid or anhydride and a polyhydric alcohol, and then reacting this product with furfuryl alcohol to form a thermosetting copolymer.

* * * * *